United States Patent [19]

Bartelink

[11] Patent Number: 4,485,273
[45] Date of Patent: Nov. 27, 1984

[54] INTERCOM ADAPTER FOR TELEPHONES

[76] Inventor: Everhard H. B. Bartelink, 15 Ridge Rd., Concord, N.H. 03301

[21] Appl. No.: 422,037

[22] Filed: Sep. 23, 1982

[51] Int. Cl.$^3$ ............................................. H04M 1/72
[52] U.S. Cl. ............................... 179/81 R; 179/99 A; 179/99 H
[58] Field of Search ............... 179/84 R, 37, 84 A, 179/99 A, 18 FA, 81 R, 99 H, 99 LC

[56] References Cited

U.S. PATENT DOCUMENTS 4,088,846  5/1978  McEowen ............... 179/81 R X
4,196,317  4/1980  Bartelink ................. 179/37

Primary Examiner—Gene Z. Rubinson
Assistant Examiner—James L. Dwyer
Attorney, Agent, or Firm—Robert Shaw

[57] ABSTRACT

Apparatus for adapting a standard telephone set for use in an intercom system communicating over the two "extra" conductors of the four-conductor wiring typically provided on the premises of a telephone subscriber. The adapter is inserted between the telephone and the premises wiring. A hold button, intercom signaling button, intercom select switch, and various indicators are provided by the adapter, which provides these features without requiring separate connection to a power source. The hold function automatically releases at the end of a conversation. Indicators warn the user to switch from intercom to central office when an incoming call is present and the intercom is selected. The intercom is usable even when the central office line is out of order.

18 Claims, 2 Drawing Figures

INTERCOM ADAPTER FOR TELEPHONES

BACKGROUND OF THE INVENTION

The present invention relates to intercom systems utilizing the telephone sets and wiring on the premises of a typical telephone subscriber.

In the prior art a telephone intercom system has been described which uses the the two "extra" conductors (normally color-coded yellow and black) of the four-conductor wiring which is provided in homes, offices and other premises. These conductors are used to provide an intercom system which is a supplement to the normal central office operation and which is independent of it. The sets used in the system described in the earlier disclosures are of the "two-line" type equipped with a signaling push button and a "hold" switch which is released through a mechanical interlock when the handset is replaced.

If a customer wants to obtain this intercom service in an area where the telephone company furnishes the customer equipment, it is a simple matter for the customer to trade his standard telephone set for a two-line, plus signaling, plus hold button telephone at the telephone company as part of his acquiring intercom service. Current Federal communications policy is to have the customer own all the terminal equipment as well as the wiring on his premises. In locations using this method of operation it would be difficult for the customer to trade in his standard phone for a two-line, plus signaling, plus hold button set.

The above conditions make it desirable to provide an adapter, which can be inserted between the subscriber's standard telephone and the wiring on his premises and which contains circuitry and switching which will provide the same operational feature as the two-line, plus signaling, plus hold button phones which after modification, were used in the earlier system. One object of the present invention is to provide the circuitry and the switching which will make this possible.

If an adapter unit containing the circuits and switching to achieve the above object is used, it must contain a switching mechanism to transfer the operations from "central office" to "intercom" operation. Suppose that this switching mechanism were left in the "intercom" mode of operation after the subscriber has terminated his call and there is an incoming call. In this case the ringer in the subscriber's telephone will not operate. It is another object of this invention to provide means by which incoming ringing will operate the ringer in the subscriber's telephone even if the switching means are left in the "intercom" position. In addition to this feature a user who picks up the handset may need a reminder that he must move the switching means to the central office mode of operation before he can complete the incoming call. It is another object of this invention to provide a positive warning to the user of the telephone which indicates that he should move the switching means to the central office mode of operation.

In some cases it is helpful to the user to have indicator lights to indicate the current mode of operation of the equipment such as "central office" or "intercom" or "central office hold circuit is activated." Some currently available equipment requires either the use of a local, mains operated, power supply at the location of each subscriber's telephone or the use of six-conductor wiring through the premises. It is another object of this invention to provide such indicator lights and assorted functions over the same four-conductor wiring systems which is used for the central office and the intercom operation on the premises.

In the case of intercom operations the supply voltage for the intercom circuit may be the same, or approximately the same, as the supply voltage at the central office, i.e., normally 48 volts, supplied through, for instance, 400 ohms. When the talk current of the intercom system is connected across this supply, the voltage on the intercom circuit will drop dramatically, for instance, to some 6 to 8 volts. This reduction in voltage on the intercom circuit may make it difficult to obtain satisfactory operation of relays and indicator lights. It is another object of this invention to overcome this problem.

When the subscriber's telephone is connected to the wiring on the premises (through an adapter unit of the present invention) the application of a "hold" circuit to the central office line must be done in this adapter unit. It is desirable to have this hold circuit release automatically at the end of a conversation. It is another object of this invention to provide this automatic release.

It is desirable to have the ringer in the subscriber telephone react to the incoming ringing on the central office line and it is also desirable to have the subscriber telephone connected directly to the central office line at any time when the power on the intercom circuit at the subscriber premises fails. It is another object of this invention to provide these features.

Other objects are addressed hereinafter.

SUMMARY OF THE INVENTION

According to the present invention, an intercom adapter connects between a telephone set and the four conductor wiring typically provided on the telephone subscriber's premises, by means of a four conductor connector and cable. The intercom adapter contains a line-selector switch, intercom signaling button, hold button, and various indicators. The adapter uses the two "extra" conductors in the wiring for the intercom circuit; these conductors also supply power to the adapter from a source of power which is connected to the intercom wiring. If this source of power fails, the telephone set is automatically connected to the central office line. The means for switching between central office and intercom lines is responsive to the line-selector switch and a talk-current detector circuit which operates when the telephone is in the off-hook condition. The hold function is automatically released when the telephone is returned to the on-hook condition. Lights indicate the status of the adapter circuit. Tone signals warn a user who tries to answer an incoming central office ring if his selector switch is in the intercom position. The intercom circuit can be used even if the central office line is out of order.

DESCRIPTION OF THE PREFERRED EMBODIMENTS

Figure 1:
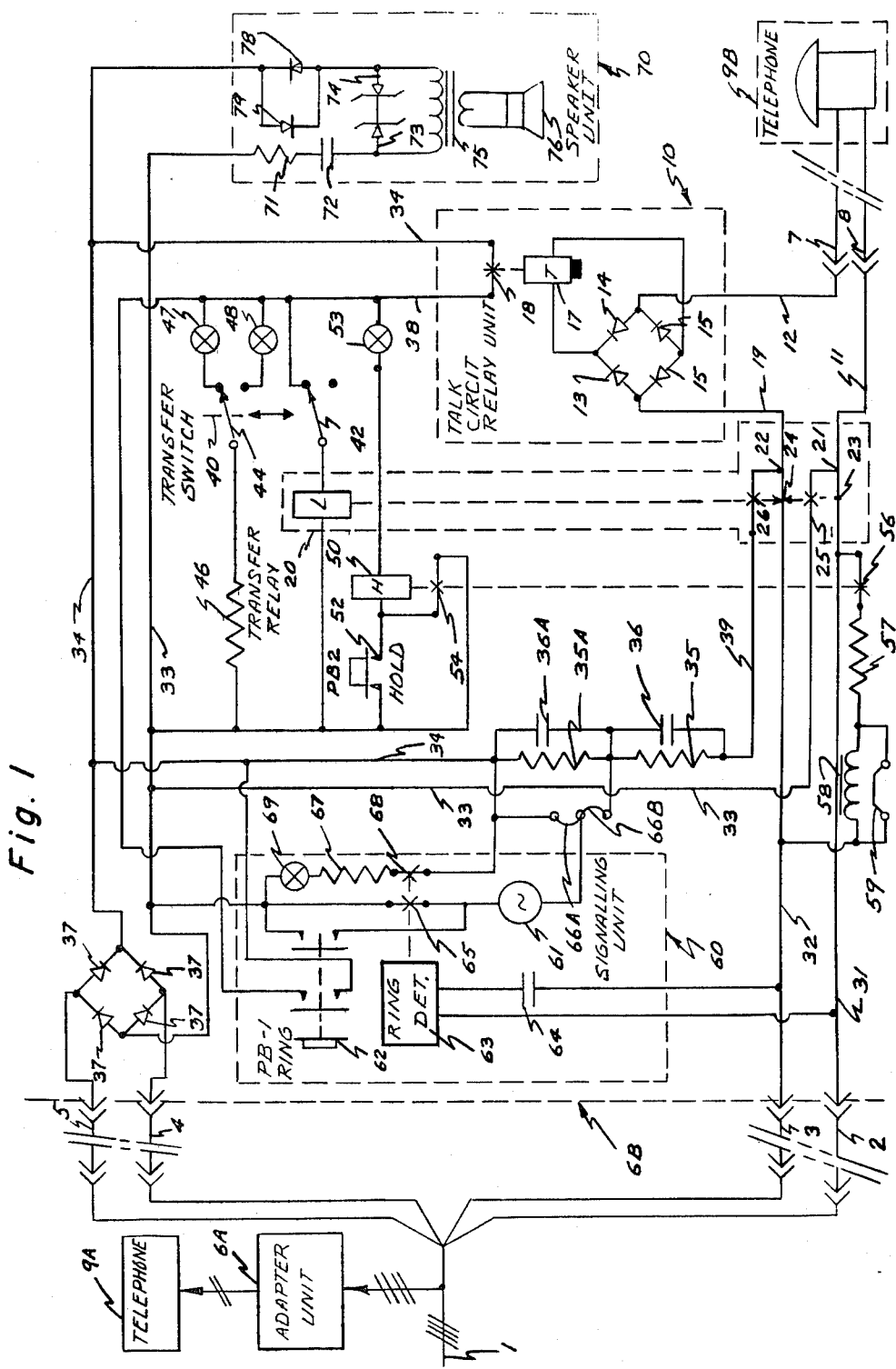
FIG. 1 is a diagrammatic representation of an intercom system employing adapters embodying the present inventive concepts.

Referring now to FIG. 1, there is shown one embodiment of this invention. FIG. 1 shows a four-wire conductor on the subscriber's premises, which is connected to a first intercom adapter unit 6A and similarly through a cable containing conductors 2, 3, 4, and 5 to a second intercom adapter unit 6B which contains circuits incorporating this invention and through it and a cable containing the conductors 7 and 8 to a subscriber telephone or other communications terminal 9B. In FIG. 1 the adapter 6B includes all the circuitry to the right of the incoming wiring except the broken-line block labeled 9B, which represents the subscriber telephone. A further telephone or other communications terminal 9A is controlled by the adapter 6A. The conductors 2 and 3 connect to the line to the central office or other remote communications center and the conductors 4 and 5 connect to the intercom line.

In the adapter unit 6B the conductor 8 of the external subscriber telephone 9B is directly connected through a conductor 11 to an arm 21 of the transfer relay or other transfer device 20 while a conductor 7 is connected to an arm 22 of this relay through a conductor 12, a talk circuit relay unit 10 and a conductor 19. In the released condition the transfer relay 20 connects the subscriber telephone 9B through its break contacts 23 and 24 to conductors 31 and 32 which lead to the central office through conductors 2 and 3. In the energized condition the transfer relay 20 connects the subscriber telephone 9B through its make-contact 25 to a conductor 33 and through its make-contact 26 and series resistors 35 and 35A to a conductor 34 whenever a transfer or first switch 40 is operated and an off-hook defector 10 has detected an off-hook condition by sensing the presence of a talk current, for example. If the intercom power supply should fail at any time, this arrangement insures that the subscriber telephone will be connected to the central office line and be able to operate normally over that line.

The conductors 33 and 34 are connected through a diode bridge 37 and the conductors 4 and 5 to the intercom wiring on the premises. The diode bridge 37 is provided to insure that the correct polarity will appear on the conductors 33 and 34 even in such outlets where the polarity of the conductors 4 and 5 is reversed. The series resistor 35 which is bridged by a condenser 36, is inserted between the conductors 33 and 34 and the subscriber telephone 9B in order to limit the current through the subscriber telephone and thereby maintain a higher voltage on the conductors 33 and 34. In some cases it is desirable to provide a tap on this series resistance. This is provided by inserting an extra resistance 35A bridged by a condenser 36A. If this tap is not needed, both straps 66A and 66B are installed and the resistor 35A and the conductor 36A can be omitted.

In FIG. 1 there is shown one version of the talk circuit relay unit 10 incorporating a slow operating relay 17 which is energized by the talk current in the handset of the subscriber's telephone 9B through a diode bridge 13, 14, 15, and 16. The talk relay 17 is made slow operating to make it insensitive to ringing and to dial pulses. The relay 17 operates a make-contact 18 which connects the intercom lead 34 to a lead 38, thereby applying DC voltage to this lead.

When a transfer switch 40 is in the position indicated in the drawing, its arm 42 energizes the transfer relay 20. This connects the subscriber telephone 9B to conductors 33 and 39 and through resistors 35 and 35A bridged by condensors 36 and 36A to conductors 33 and 34. When the subscriber replaces his handset, the talk circuit relay unit 10 releases and the transfer relay 20 restores the connection between the subscriber telephone 9B and the central office circuit 31 and 32. An arm 44 of the transfer switch 40 energizes indicator lamps 47 or 48 through a common series resistor 46.

A hold circuit consisting of a resistor 57 and an optional inductor 58 can be connected across the central office circuit 31 and 32 by a hold relay 50. The relay 50 is energized by temporarily depressing a push button 52. The relay 50, when activated, completes its own holding circuit over make-contact 54, and connects the hold circuit 57-58 through its make-contact 56. When the subscriber replaces the handset, the talk circuit relay unit 10 opens make-contact 18 which in turn deactivates the relay 50. An indicator lamp 53 indicates that the hold relay 50 is activated. In those cases where a resistive hold circuit is acceptable, an option strap 59 may be installed to short the inductor 58. If resistive hold circuits are acceptable in all applications the inductor 58 may be omitted altogether.

In FIG. 1 there is shown one version of the signaling unit 60. It comprises a signaling generator 61, which produces an AC signal when DC voltage is applied to it, and which can be connected between the conductors 33 and 34 under the control of a make-contact on a second switch consisting of push button, or equivalent device 62. In certain conditions it may be desired to apply a reduced DC voltage to the signal generator 61 for the purpose of reducing its AC output when the subscriber telephone 9B is in the off-hook condition and is connected to the intercom circuit 4 and 5. In that case, an option strap 66B is installed. In this case, the DC voltage across the signal generator 61 is reduced by the voltage drop which appears across the resistor 35A. The resistors 35 and 35A are bridged by the condensors 36 and 36A to provide a low impedance for the speech signals. If it is desired to apply a full DC voltage to the signal generator 61, then an option strap 66A is installed. If it is decided that full DC voltage will be applied to signal generator 61 in all applications of the adapter 6B, then the resistors 35 and 35A can be replaced by a single resistor of suitable value and the condensors 36 and 36A can be replaced by a single condensor of suitable value.

When incoming ringing is applied to the adapter unit 6B while the subscriber's handset is in the on-hook condition, the transfer relay 20 is released and the incoming ringing is applied directly to the ringer in the subscriber telephone 9B. When the subscriber lifts the handset while the transfer switch 40 is in the intercom position, the subscriber telephone 9B is transferred to the intercom system and the ringing in the subscriber telephone stops. To alert the subscriber that he must switch to the central office line, the incoming ringing activates a ring detector 63 through a series condensor 64. When energized, the ring detector 63 closes its make-contact 65 which is connected in parallel to the make-contacts of the push button 62. As a result, ringing on the central office line will energize the signal generator 61, and produce an audible signal in the receiver's handset to alert the user. Through a make-contact 68 of the ring detector 63, a visual signal will be produced on a lamp 69 through a series resistor 67.

During the periods when the signaling generator 61 is energized, its AC output is connected through the diode bridge 37 to the conductors 4 and 5 and through them to the intercom wiring on the premises. Signaling voltages present in the intercom wiring will be applied to other intercom telephones or adapters and produce audible signaling in the loud speakers of these units. In those cases where an adapter unit and a single line telephone are used, the signaling voltages received from the intercom wiring on the premises, will be impressed on the conductors 33 and 34 through the diode bridge 37. A speaker unit 70 is permanently connected across the conductors 33 and 34. It contains a loud speaker 76 driven by a transformer 75. The speaker 76 is protected against over voltages by zener diodes 73 and 74. This combination 73-74 is connected to the conductors 33 and 34 through a resistor 71 and a condensor 72 and through threshold diodes 77 and 78.

It should be noted that the transfer relay 20 is normally in the released condition so that the subscriber telephone 9B is connected directly to the central office line. If this central office line does not have any DC voltage on it, there will be no current when the handset is lifted, the talk circuit relay unit 10 will not operate, and switching to the intercom circuit will not occur. There may be certain occasions when the central office circuit is out of order but the subscriber still wants to use his intercom circuit. To make this possible, an extra set of contacts on the signaling push button 62 will temporarily bridge the make-contact 18 of the talk circuit relay unit 10. This energizes the transfer relay 20; it will remain energized so long as the transfer switch 40 is in the intercom position and the subscriber's handset is off hook. Other parties who want to use the intercom should, when they observe the call signal, depress their signaling push button for a short moment to activate their unit.

Figure 2:
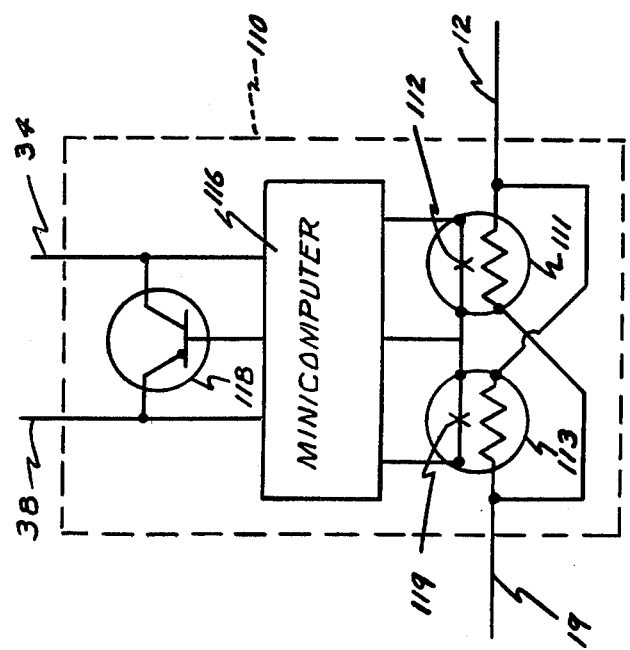
FIG. 2 is a schematic diagram of an alternative embodiment of a talk cifcuit relay unit useful in intercom adapters.

Referring now to FIG. 2, there is shown an alternate circuit 110 for performing the functions of the talk circuit relay unit 10. The conductor 12 which as shown in FIG. 1 is connected to the subscriber telephone 9B, is connected to two optical isolator devices 111 and 113 and through them to a conductor 19 which is connected to the arm 22 of the transfer relay 20. The optical isolator 111 reacts to current in one direction while the optical isolator 113 reacts to current in the other direction. When one of the optical isolators is energized, it will complete circuits as symbolically indicated by make-contacts 112 and 114. These contacts complete circuits into a logic circuit 116. This logic circuit might be implemented using digital logic or a microprocessor. The logic circuit 116 in turn controls a transistor or equivalent device 118 which can either interrupt or complete a path from the conductor 34 to the conductor 38. The logic circuit 116 is arranged in such a way that it will open the circuit between the conductors 34 and 38 when neither of the optical isolator contacts 112 or 114 is closed, and that it will close this circuit when one of these contacts is closed. The optical isolators 111 and 113, or the logic circuit controlled by them are arranged in such a way that short interruptions or reversals of the current from the conductor 12 through the optical isolators 111 and 113 to the conductor 19 will not cause interruptions in the circuit between the conductors 34 and 38. As a result dial pulses will not cause the switching device 118 to interrupt the current between conductors 34 and 38. If the device 110 is exposed to AC ringing currents both optical isolators will operate thereby closing the circuits at the make contacts 112 and 119. The logic circuits 116 are so arranged that if both contacts 112 and 119 are closed, they will leave the device 118 in the open-circuit condition. Thus the switching device 118 will not react to AC ringing.

With regard to the foregoing description, it will be understood by those skilled in the art that many modifications and variations of the present invention may be made without departing from the spirit of the invention.

What is claimed is:

1. An intercom adapter for connecting a line from a user's communications terminal to one of either the line to a communications switching center or a local intercom line, said adapter comprising:

off-hook detection means for detecting an off-hook condition in the communications terminal;

first control means for a user of the communications terminal to choose between connection of the communications terminal either to the remote communications center or connection to the intercom line; and transfer means for transferring the communications terminal selectively between the remote communications center and the intercom line, said transfer means being responsive to said off-hook detection means and said first control means such that the communications terminal is connected to the intercom line when both the user has selected the intercom and an off-hook condition is detected and the communications terminal is connected to the remote communications center when at least one of these two conditions is not met.

2. The intercom adapter of claim 1 further comprising two conductors, each connecting to a conductor in the intercom line;

and wherein:

said first control means comprises a first switch;

said transfer means comprises a transfer device;

said off-hook detection means completes a circuit upon the detection of the off-hook condition; and said first switch, said circuit, and said transfer device are connected in series across said two conductors.

3. The intercom adapter of claim 2 wherein said two conductors are connected to the intercom line through a diode bridge.

4. The intercom adapter of claims 1, 2, or 3 further comprising:

second control means for responding to a command from a user of the telephone to generate a ring signal on the intercom line;

indicator means responsive to a ring signal on the intercom line; and generation means for generating a ring signal on the intercom line, said generation means being responsive to said second control means.

5. The intercom adapter of claim 4 wherein said second control means further activates said transfer means to connect the remote communications center to the intercom line even though the line to the remote control center may be out of order.

6. The intercom adapter of claims 1, 2, or 3 further comprising:

third control means responsive to a command from a user of the communications terminal to place the line to the remote communications center in a hold state; and loading means for selectively loading the line to effect a hold condition, said loading means being initially activated in response to said third control means and remaining activated only as long as an off-hook condition exists on the line to the communications terminal.

7. The intercom adapter of claims 1, 2, or 3 further comprising a resistor, said resistor being in series with one conductor of the intercom line between the intercom line and the transfer means.

8. The intercom adapter of claims 1, 2, or 3 further comprising a resistor bridged by a condenser, said resistor being in series with one conductor of the intercom line between the intercom line and the transfer means.

9. The intercom adapter of claims 1, 2, or 3 further comprising:
   means for detecting a ring signal on the line from the central office; and
   detection means responsive to a ring signal on the line from the communications terminal;
   generation means for generating a ring signal on the intercom line, said ring generation means being responsive to said means for detecting a ring signal.

10. The intercom adapter of claims 1, 2, or 3 further comprising means for indicating to a user of the telephone the presence of a ring signal on the line from the communications center.

11. The intercom adapter of claims 1, 2, or 3 wherein said off-hook detection means is sufficiently slow acting to avoid responding to dial pulses transmitted by the communications terminal.

12. The intercom adapter of claims 1, 2, or 3 wherein said off-hook detection means comprises:
   two optical isolator devices responsive to the presence of current in the communications terminal line, of which one operates in response to current in one direction and the other operates in response to current in the other direction; and
   switching means for completing another circuit, said completing occuring when either of the optical isolator devices has operated, and said completing being inhibited when neither or both of the optical isolators have operated.

13. The intercom adapter of claim 11 in which the communications terminal is a telephone and further comprising means for making the off-hook detection means insensitive to dial pulses.

14. In a system containing a first two-wire circuit which gives access to a telephone company central office or to other communications devices, containing a second two-wire circuit serving as an intercom circuit and containing a third two-wire circuit leading to the user's telephone set or other communications terminal,
   an intercom adapter interconnecting these circuits, said adapter comprising
   a transfer device, a switch and a control circuit, which control circuit contains means for detecting an off-hook condition in the third circuit and which, when detecting the off-hook condition completes a circuit through the transfer device, thereby causing it to connect the third circuit to the second circuit, but during only those periods when, in addition, the switch is in the closed position, thereby completing the circuit.

15. In the system of claim 14, impedance means connected between the second circuit and the third circuit to limit current flow into the third circuit.

16. A system according to claim 15 in which the impedance means comprises a resistance connected between the second circuit and the third circuit.

17. A system according to claim 15 that includes capacitance means by-passing the impedance means to provide a low-impedance path for speech and other communications current.

18. A method of effecting switching between communications channels in a system containing a first two-wire circuit which gives access to communications devices, containing a second two-wire circuit serving as an intercom circuit and containing a third two-wire circuit leading to a user's telephone set or other communications terminal, that comprises:
   connecting the third circuit leading to the user's telephone or other communications terminal to said first circuit through a transfer device, a switch and a control circuit, which control circuit detects an off-hook condition, connecting the third circuit to said second circuit through the transfer device only during those periods which (a) the switch is closed while and (b) at the same time an off-hook condition exists and is detected in said third circuit.

* * * * *